US006724421B1

United States Patent
Glatt

(10) Patent No.: US 6,724,421 B1
(45) Date of Patent: *Apr. 20, 2004

(54) VIDEO SURVEILLANCE SYSTEM WITH PILOT AND SLAVE CAMERAS

(75) Inventor: Terry Laurence Glatt, Oakland Park, FL (US)

(73) Assignee: Sensormatic Electronics Corporation, Boca Raton, FL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/568,402

(22) Filed: Dec. 15, 1995

Related U.S. Application Data

(63) Continuation of application No. 08/343,109, filed on Nov. 22, 1994, now abandoned.

(51) Int. Cl.$^7$ .................................................. H04N 7/18
(52) U.S. Cl. ........................................ 348/154; 348/143
(58) Field of Search ............................... 348/169, 143, 348/154, 170, 171, 155, 156

(56) References Cited

U.S. PATENT DOCUMENTS

| | | | | |
|---|---|---|---|---|
| 5,091,780 A | * | 2/1992 | Pomerleau | 348/152 |
| 5,111,288 A | * | 5/1992 | Blackshear | 348/151 |
| 5,164,827 A | * | 11/1992 | Paff | 348/154 |
| 5,185,667 A | * | 2/1993 | Zimmermann | 348/151 |
| 5,200,818 A | | 4/1993 | Neta et al. | 358/87 |
| 5,270,811 A | * | 12/1993 | Ishibashi et al. | 348/152 |
| 5,359,363 A | * | 10/1994 | Kuban et al. | 348/155 |
| 5,382,943 A | * | 1/1995 | Tanaka | 348/154 |
| 5,384,588 A | * | 1/1995 | Martin et al. | 348/154 |
| 5,517,236 A | * | 5/1996 | Sergeant et al. | 348/143 |
| 5,521,634 A | * | 5/1996 | McGary | 348/169 |
| 5,526,041 A | * | 6/1996 | Glatt | 348/143 |

OTHER PUBLICATIONS

Takano et al., Intruder Detection System by Image Processing, Oct. 12, 1994, pp 31–33.

* cited by examiner

Primary Examiner—Andy Rao

(57) ABSTRACT

A video surveillance system for monitoring an area is made up of a stationary pilot camera for monitoring the area and one or more moveable slave cameras for monitoring at least part of the area. Each slave camera is allocated to part of the area being monitored. The pilot camera produces a signal representative of the area. The location of a moving object in the area monitored by the pilot camera is determined. A signal is produced representing the location of the object. The slave cameras track the object based on the signal representing the location of the object. The pilot camera is provided with a fisheye lens and thus has a field of view wider than that of the slave cameras. The area being monitored is divided into cartesian, polar or spherical coordinates thereby enabling a microcomputer to instruct the slave camera to follow the object. The signal representative of the area is compressed and transmitted over a communications channel for remote monitoring.

35 Claims, 3 Drawing Sheets

VIDEO SURVEILLANCE SYSTEM WITH PILOT AND SLAVE CAMERAS

This is a continuation under 37 CFR 1.62 of prior application Ser. No. 08/343,109, filed Nov. 22, 1994 now abandoned.

BACKGROUND

The present invention relates generally to video surveillance systems. More particularly, it relates to a video surveillance system in which a pilot camera controls the operation of one or more slave cameras.

Known video surveillance systems often monitor relatively large areas by means of several video cameras or "domes." A dome may include one or more cameras, the operation of which can be remotely controlled. A camera in such a dome is typically equipped with a zoom lens which has a limited field of view. The camera can also be panned and tilted by remote control. The extent to which a particular camera or dome is able to monitor an area is limited by the field of view of its lens and the extent to which it can be panned and tilted. It is therefore possible for an intruder to avoid detection by a surveillance system if he can dodge the movement of the camera and keep out of its field of view. Thus, in order to minimize this problem, particularly when the monitored area is large, a system of the prior art uses a large number of domes operating under program control to cover the entire area. However, such systems do not eliminate the risk that an intruder will be undetected. In addition, such systems require a large number of cameras and a relatively complex control program in order to minimize the opportunity for intruders to escape detection.

SUMMARY OF THE INVENTION

The present invention is a video surveillance system for monitoring an area. The system is made up of a pilot camera for monitoring the area and a slave camera for monitoring at least part of the area. The pilot camera produces a signal representative of the area. Means are provided for determining the location of a moving object in the area monitored by the pilot camera from the signal representative of the area and for producing a signal representing the location of the object. Means are also provided for causing the slave camera to track the moving object based on the signal representing the location of the object.

In the preferred embodiment the pilot camera is stationary and the slave camera is moveable. The pilot camera has a field of view wider than that of the slave camera. To that end the pilot camera is provided with a fisheye lens. The signal containing the fisheye image produced by the camera can be compressed and transmitted over a communications channel to a remote monitoring station. The location of the object is determined by detecting the motion of the object.

The invention also includes a method of monitoring an area comprising the steps of monitoring the area by means of a pilot camera, thereby producing a signal representative of the area; processing the video output to determine the location of a moving object in the area and producing a signal representative of the location of the object; and controlling a slave camera such that the slave camera tracks the moving object based on the signal representative of the location of the object.

DETAILED DESCRIPTION

The following is a description of the preferred embodiment of the invention. It is intended to be illustrative of the invention rather than limiting. The full scope of the invention is to be determined by the appended claims and their equivalents.

Figure 1:
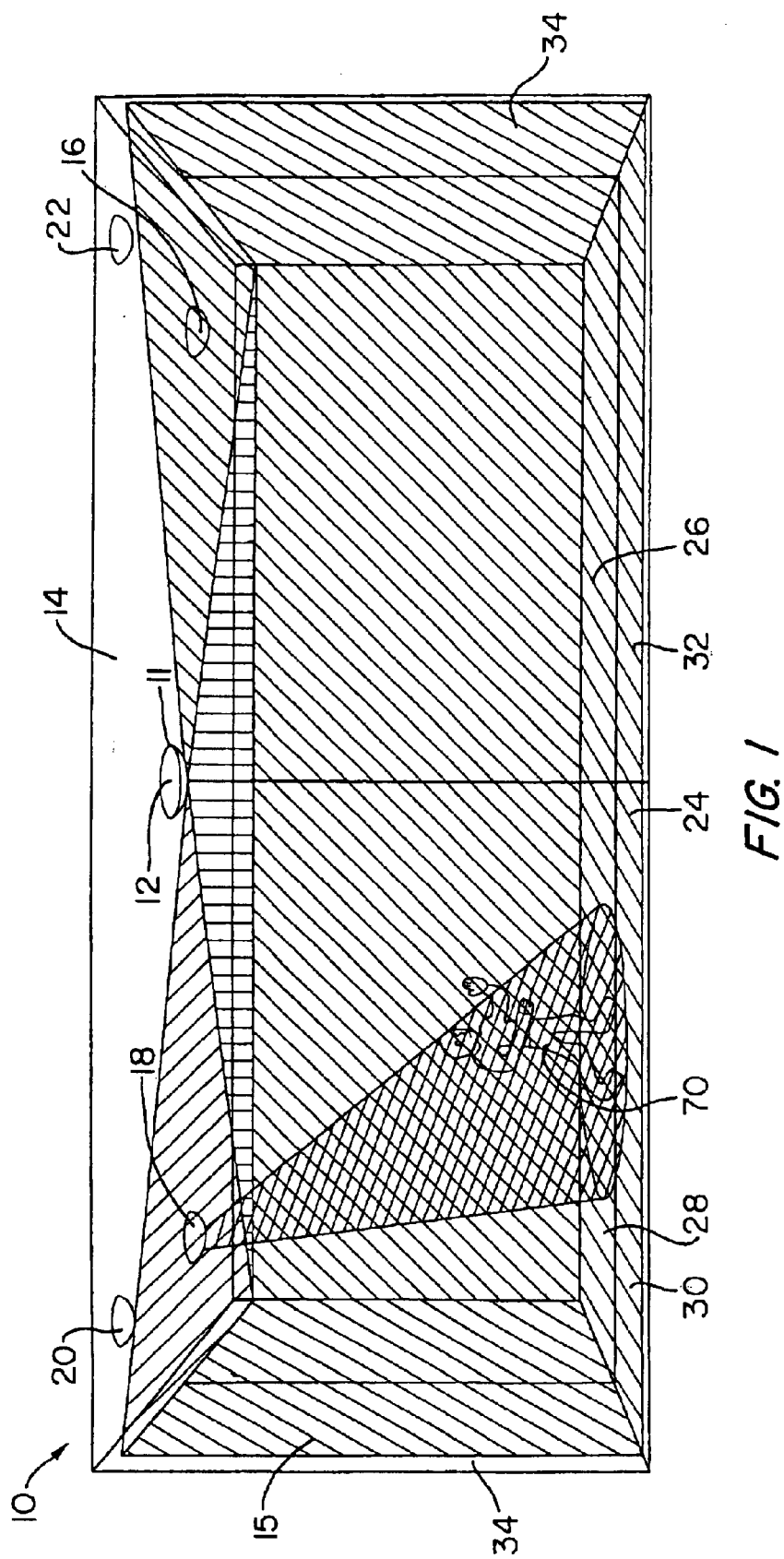
FIG. 1 is a perspective view of a space monitored by the present invention, showing a pilot camera and slave cameras as well as the field of view of the pilot camera and one slave camera.

In FIG. 1, the invention is shown installed in a large room 10 such as a warehouse having ceiling 14, floor 24 and walls 34. A stationary pilot camera 12 is contained in pilot dome 11 mounted on ceiling 14. Pilot camera 12 is a video camera of a type commonly used in video surveillance, except that it has a lens 13 (see FIG. 3) having a very wide angle of view, preferably a fisheye lens having a field of view of 180 degrees. The field of view of lens 13 of pilot camera 12 is wide enough for it to monitor an area 15 corresponding to the hatched area in FIG. 1 and covering the entire expanse of floor 24 and part of walls 34.

Figure 2:
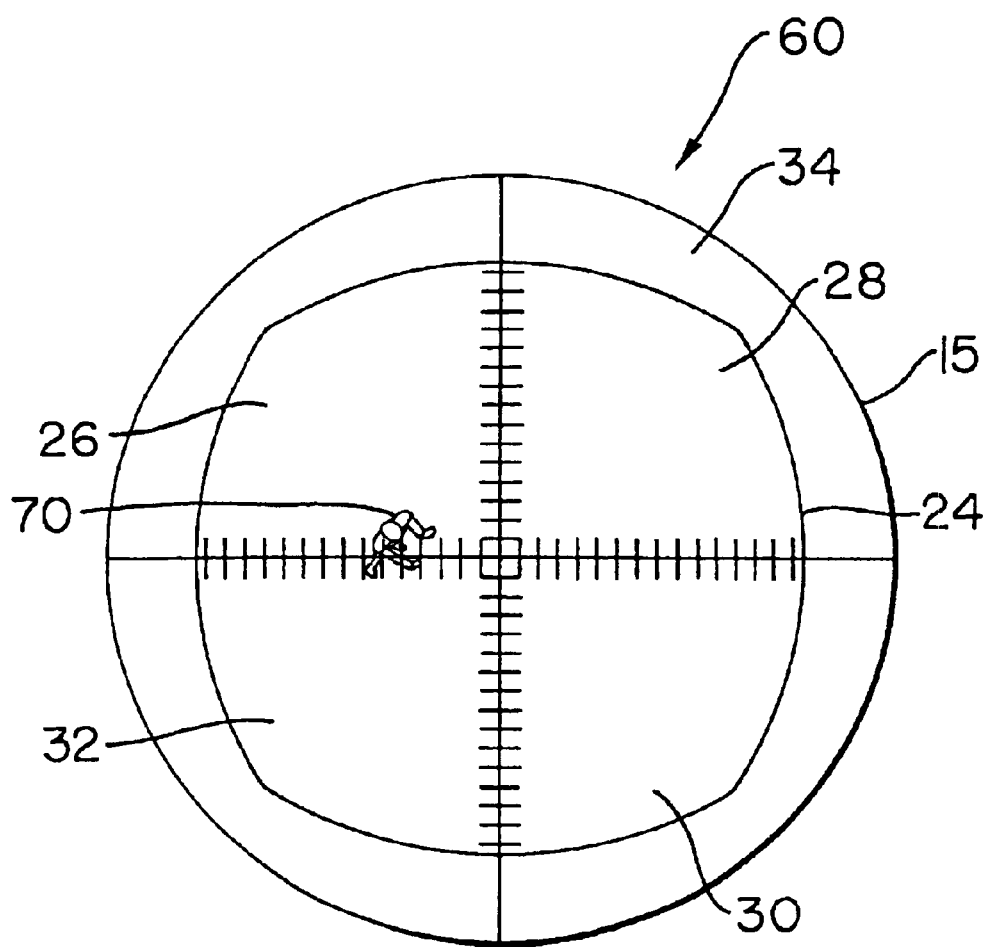
FIG. 2 is a diagram of the image produced by the pilot camera.

Slave cameras 16, 18, 20 and 22 are mounted on ceiling 14. Each of slave cameras 16, 18, 20 and 22 is a conventional video surveillance camera contained in a "dome." The term "dome" refers here to an enclosure housing at least one camera capable of panning, tilting and zooming. The preferred dome is the SpeedDome available from Sensormatic Electronics Corp. of Deerfield Beach, Fla. Each slave camera 16, 18, 20 and 22 can be tilted, panned and zoomed by remote control. Cameras 16, 18, 20 and 22 respectively have lenses 17, 19, 21 and 23 (See FIG. 3). Lenses 17, 19, 21 and 23 are preferably zoom lenses which have a field of view less than that of lens 13 of the pilot camera (ranging from 6 to 60 degrees in a 10× lens). Each slave camera is allocated a portion of the total field of pilot camera 12. Each camera 16, 18, 20 and 22 thus monitors part of the total area 15 monitored by pilot camera 12. Cameras 16, 18, 20 and 22 are respectively assigned to monitor cells 26, 28, 30 and 32 which are formed by dividing floor 24 and walls 34 into sectors as shown in FIGS. 1 and 2. While the field of view of lenses 17, 19, 21 and 23 of cameras 16, 18, 20 and 22 is far narrower than the full extent of each cell, the cameras can pan, tilt and zoom so each camera is able to cover the cell to which it is assigned (i.e. a part of the total area monitored by the pilot camera). The ability to pan and tilt allows each slave camera to track the movement of an object (an intruder for example) within the cell to which the camera is assigned and into an adjacent cell.

Figure 3:
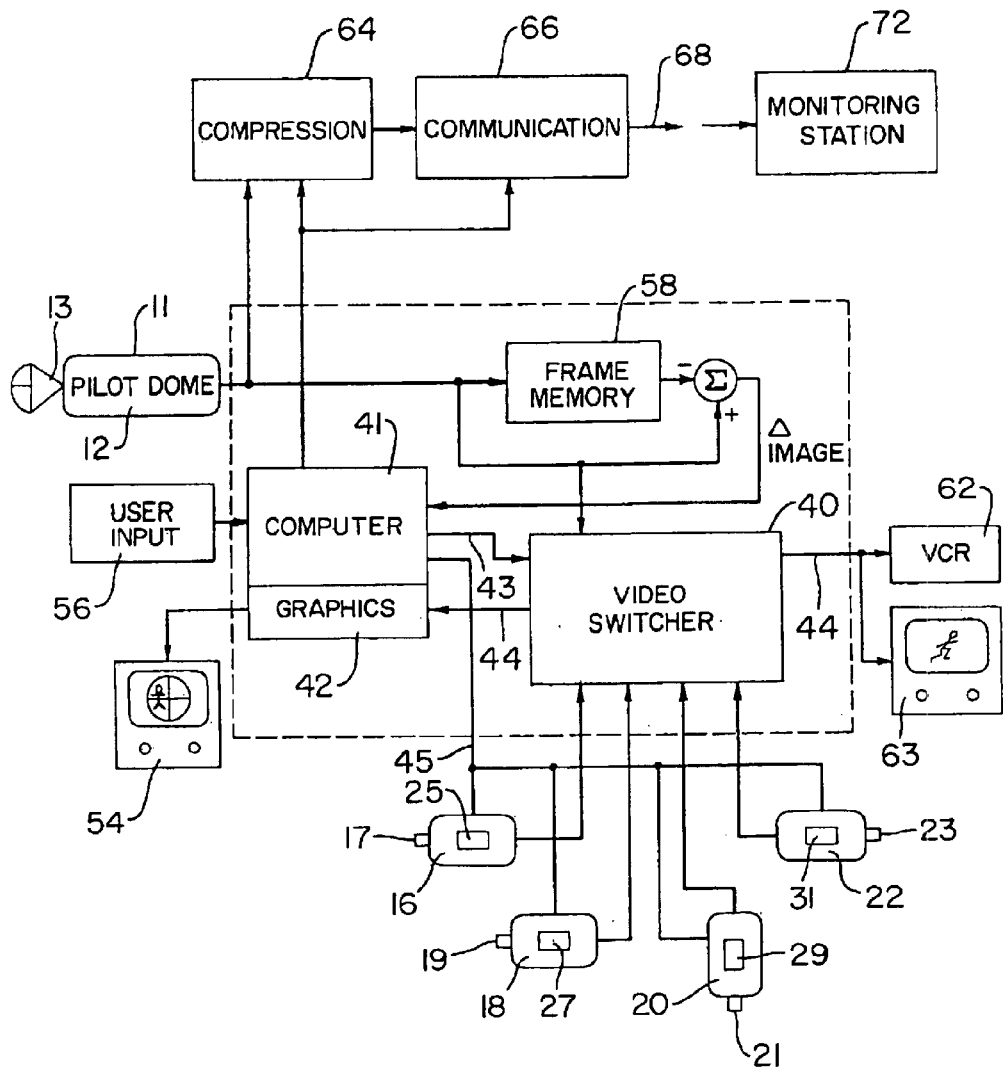
FIG. 3 is a block diagram of the control system of the present invention.

The invention is illustrated in more detail in block diagram form in FIG. 3. The system comprises a pilot dome 11 containing a pilot camera 12 having fisheye lens 13 and slave cameras 16, 18, 20 and 22, respectively having lenses 17, 19, 21 and 23. Such cameras are conventional PTZ camera devices available from Sensormatic Electronics Corp. of Deerfield Beach, Fla. under the name SpeedDome. Such a camera incorporates a controller in the form of Z180 processor. Pilot camera 12 and slave cameras 16, 18, 20 and 22 are connected to video switcher 40 which has video outputs 44. Switcher 40 is controlled by computer 41 via control line 43. Video output 44 of switcher 40 is fed into computer 41, which is provided with graphics adapter 42. Computer 41 can instruct switcher 40 to select any of cameras 12, 16, 18, 20 and 22, the output of which can be displayed on monitor 54 with or without overlaid graphics provided by graphics adapter 42. Video output 44 can also be connected to video cassette recorder 62 and monitor 63 as shown in FIG. 3.

Computer 41 is programmed to instruct, via bus 45, any of cameras 16, 18, 20 and 22 to pan, tilt, zoom, focus, change f-stop etc. Slave cameras 16, 18, 20 and 22 are respectively equipped with controllers 25, 27, 29 and 31 which cause the camera to pan, tilt and zoom under the control of computer 41. A user input 56 in the form of "Touchtracker" input device (available from Sensormatic Electronics) or a mouse or trackball allows the user to control the operation of the slave cameras as well as switcher 40. An example of a system having the ability to control a plurality of cameras from an input device and to overlay graphics is the Videomanager System available from Sensormatic Electronics.

FIG. 2 represents the image 60 produced by fisheye lens 13 of pilot camera 12. Pilot camera 12 is placed vertically above floor 24. Due to the fact that lens 13 is preferably a fisheye lens which has an extremely wide angle of view (180 degrees), camera 12 is able to monitor all of cells 26, 28, 30 and 32. The pilot camera generates an electrical signal representative of the area it monitors and reproduces the scene within its field of view as a circular and flat fisheye image 60 as shown in FIG. 2. In spite of the fact that walls 34 are perpendicular to floor 24, the fisheye lens causes walls 34 to appear flat but somewhat distorted at the outer edges of the image produced by camera 12.

Any point in cells 26, 28, 30 and 32 can be described by reference to a Cartesian (or polar/spherical) coordinate system. Image 60 is made up of a large number of pixels. Therefore, each pixel can be mapped to, and is identified by, a reference to the chosen coordinate system. A map of the coordinates versus the pixels in the image generated by camera 12 is stored in the memory of computer 41. Thus, for substantially every pixel corresponding to cells 26, 28, 30 and 32 within image 60, there is a unique coordinate stored in the memory of computer 41. The location of an object in any of the cells can be described by reference to the coordinates corresponding to the location. Computer 41 is programmed to instruct controllers 25, 27, 29 and 31 respectively to direct slave cameras 16, 18, 20 and 22 to point at a particular point in the cell to which the particular slave camera is assigned. That point is identified by coordinates stored in the memory of computer 41 and corresponds to specific pixels in image 60. Thus, for example, if an object 70 (in this case an intruder) at a location in cell 28 is detected by means of pilot camera 12, slave camera 18 can be directed by computer 41 to pan and/or tilt and thus point at the location and to follow the movement of an object 70 within the cell to which it is assigned. Camera 18 tracks object 70 at least until object 70 moves into an adjacent cell 30, when computer 41 instructs the camera assigned to that cell (camera 20) to take over the surveillance from camera 18. In an alternative embodiment, more than one of slave cameras 16, 18, 20 and 22 is instructed to track object 70 so that it can be viewed from several angles.

In order to control a slave camera such that it tracks the motion of an object such as an intruder, it is necessary to locate the object within the area monitored by the pilot camera. This is preferably accomplished by a simple difference algorithm. Successive frames acquired by the pilot camera are stored and subtracted from one another by storing the previous frame in RAM (frame store) 58 and subtracting it from the current frame pixel by pixel. Since the surroundings in which object 70 is found are substantially stationary; the subtraction of successive frames will cancel out the surroundings, leaving only the moving object. The image remaining after subtraction of subsequent frames is referred to as a "delta image." This delta image, made up of a number of pixels, is continuously mapped to the coordinates stored in the memory of computer 41 which instructs the slave camera assigned to the cell in which the object is found to point at the object.

In order to account for relatively slow moving surroundings such as waving flags, plants etc., the delta image can be averaged over a number of frames or calculated from several previous frames (e.g. four previous frames). If the difference indicated by the delta image remains within a certain maximum movement or travel range, it can be ignored. If the difference indicated by the delta image is outside the maximum movement or range, a start signal will be generated so that computer 41 instructs the appropriate slave camera to track the movement of the object. In addition, video cassette recorder (VCR) 62 can be instructed to start recording on such detection of motion. A storage device such as a disk drive can be substituted for VCR 62. Thus, as any particular slave camera follows the movement of an object, the image so acquired is stored by the VCR As the object moves through successive cells, the output of the slave camera assigned to the cell in which the object is found is fed into the VCR.

An alternative way of detecting the location of object 70 is to use a pilot camera having a charge coupled device (CCD) sensitive to specific frequencies of radiation emitted by object 70, for example, radiation in the infra-red spectrum. The slave cameras are then directed to the coordinates which correspond to the pixels of the CCD which have detected the specific infra-red radiation.

The use of a fisheye lens in the present invention makes the image captured by camera 12 highly suitable for compression and transmitted over a communications channel. While an object in the field of view of a fisheye lens moves, the background remains substantially still. This high temporal redundancy means that compression is more readily accomplished than would be the case with a conventional PTZ camera since successive frames contain more information in common with each other. In order to track a moving object with a conventional camera, the camera must be panned, tilted and/or zoomed. The image changes a great deal over time as the camera is panned, tilted or zoomed since the background appears to move as the camera moves. This makes compression more cumbersome than in the case of the image generated by a camera having a fisheye lens.

Compression hardware 64 is connected directly to pilot dome 11 and to computer 41. This allows the raw video output of pilot camera 12 to be compressed. Compression hardware 64 is based upon a video compression set available from Integrated Information Technology, Inc. of Santa Clara, Calif. under the name Vision Controller/Vision Processor or equivalent circuitry. Compression schemes such as JPEG, MPEG or H 261 can be implemented using this hardware. The compressed video signal produced by compression hardware 64 is fed into communications interface 66. Communications interface 66 is a conventional interface such as a modem or ISDN interface. Both compression hardware 64 and communications interface 66 are controlled by computer 41.

The above structure allows a large area to be monitored by the pilot camera and transmitted to a remote monitoring station over a communications channel having a relatively limited bandwidth. Computer 41 instructs compression hardware 64 to compress the video signal generated by camera 12 and instructs communications interface 66 to commence transmission of the compressed video image over communications channel 68 to remote monitoring station 72. The image is decompressed and displayed at the monitoring station. The decompressed image can then be monitored for intruders. While the decompressed fisheye image may not provide resolution sufficient to detect details such as the facial features of an intruder, when an intruder is observed appropriate action can be taken at the monitoring station, for example, calling the police. In the meantime, computer 41 can instruct slave cameras 16, 18, 20 and 22 to track the intruder and VCR 62 to record so that the intruder can be identified.

I claim:

1. A video surveillance system for monitoring an area comprising:
    a pilot camera for monitoring the area and producing an image of the area;
    a slave camera for monitoring at least part of the area;
    means for automatically determining a location of an object in the area monitored by the pilot camera from the image of the area and for producing a signal representing the location of the object;
    means for causing the slave camera to track the object based on the signal representing the location of the object.

2. The system of claim 1 wherein the pilot camera has a field of view wider than the field of view of the slave camera.

3. The system of claim 1 wherein the pilot camera is stationary and the slave camera is movable.

4. The system of claim 3 wherein the means for causing the slave camera to track the object comprises means for panning or tilting the slave camera.

5. The system of claim 1 wherein the pilot camera has a fisheye lens.

6. The system of claim 1 wherein the object is a moving object and the means for determining the location of the object comprises means for detecting the motion of the object.

7. The system of claim 1 wherein the pilot camera produces a plurality of images of the area and wherein the means for detecting the location of the object comprise means for subtracting successive images of the area from each other.

8. The system of claim 1 wherein the means for determining the location of the object comprises means for detecting specific frequencies of radiation emitted by the object.

9. The system of claim 1 further comprising means for compressing the image of the area to produce a compressed image and means for transmitting the compressed image over a communications channel.

10. For use in a video surveillance system, a method of monitoring an area comprising the steps of:
    monitoring the area by means of a pilot camera thereby producing an image of the area;
    processing the image of the area to automatically determine a location of an object in the area and producing a signal representative of the location of the object;
    controlling a slave camera such that the slave camera tracks the object based on the signal representative of the location of the object.

11. The method of claim 10 wherein the pilot camera has a wider field of view than the slave camera.

12. The method of claim 10 wherein the pilot camera is stationary and the slave camera is movable.

13. The method of claim 10 wherein the step of controlling comprises panning or tilting the slave camera.

14. The method of claim 10 wherein the step of processing comprises a step of detecting motion in the object.

15. The method of claim 10 wherein the pilot camera produces a plurality of images of the area and wherein the step of processing comprises a step of subtracting successive images of the area from each other.

16. The method of claim 10 wherein the step of processing comprises a step of detecting specific frequencies of radiation emitted by the object.

17. The method of claim 10 further comprising the steps of compressing the image to form a compressed image and transmitting the compressed image over a communications channel.

18. A video surveillance system for monitoring an area comprising:
    a pilot camera for monitoring the area and producing an image of the area;
    a slave camera for monitoring at least part of the area;
    means for automatically determining a location of an object in the area monitored by the pilot camera from the image of the area and for producing a signal representing the location of the object;
    means for causing the slave camera to track the object based on the signal representing the location of the object by panning or tilting the slave camera.

19. The system of claim 18 wherein the pilot camera is stationary and the slave camera is movable.

20. The system of claim 18 wherein the means for determining the location of the object comprises means for detecting motion of the object.

21. The system of claim 18 wherein the pilot camera produces a plurality of images of the area and wherein the means for detecting the location of the object comprise means for subtracting successive images of the area from each other.

22. The system of claim 18 wherein the means for determining the location of the object comprises means for detecting specific frequencies of radiation emitted by the object.

23. The system of claim 18 further comprising means for compressing the image of the area to produce a compressed image and means for transmitting the compressed image over a communications channel.

24. A video surveillance system for monitoring an area, comprising:

a pilot camera, comprising a fisheye lens, for producing an image of the area;

means for analyzing the image of the area to automatically determine a location of an object in the area and for generating a signal representing the location of the object in the area;

a slave camera;

means for causing the slave camera to track the object based on the signal representing the location of the object in the area;

means for compressing the image of the area to produce a compressed image;

means for transmitting the compressed image to a remote monitoring station.

25. The system of claim 24 wherein the pilot camera is stationary and the slave camera is movable.

26. The system of claim 25 wherein the means for causing the slave camera to track the object comprises means for panning or tilting the slave camera.

27. The system of claim 24 wherein the object is a moving object and the means for analyzing comprises means for detecting motion of the object.

28. The system of claim 24 wherein the pilot camera produces a plurality of images of the area and wherein the means for detecting the location of the object comprise means for subtracting successive images of the area from each other.

29. For use in electronic surveillance system, a method of monitoring an area comprising the steps of:

monitoring the area by means of a pilot camera comprising a fisheye lens, thereby producing an image of the area;

processing the image of the area to automatically determine the location of an object in the area and producing a signal representative of a location of the object;

controlling a slave camera such that the slave camera tracks the object based on the signal representative of the location of the object;

compressing the image of the area;

transmitting the compressed image to a remote monitoring station.

30. The method of claim 29 further comprising the steps of:

processing the signal representative of the area to determine the location of an object in the area and producing a signal representative of the location of the object;

controlling a slave camera such that the slave camera tracks the object based on the signal representative of the location of the object.

31. The method of claim 29 wherein the pilot camera is stationary and the slave camera is movable.

32. The method of claim 31 wherein the step of controlling comprises panning or tilting the slave camera.

33. The method of claim 29 wherein the object is a moving object and the step of determining the location of the object comprises detecting the motion of the object.

34. The method of claim 30 wherein the pilot camera produces a plurality of images of the area and wherein the step of detecting the location of the object comprises subtracting successive images of the area from each other.

35. The system of claim 29 wherein the step of determining the location of the object comprises the step of detecting specific frequencies of radiation emitted by the object.

* * * * *